United States Patent [19]

Dittmar

[11] Patent Number: 5,515,028
[45] Date of Patent: May 7, 1996

[54] VEHICULAR LAMP STATUS DISPLAY SYSTEM

[76] Inventor: Norman R. Dittmar, 525 5th Ave. NW., Rochester, Minn. 55901-2840

[21] Appl. No.: 192,015

[22] Filed: Feb. 4, 1994

[51] Int. Cl.$^6$ .................................................. B60Q 11/00
[52] U.S. Cl. ..................... 340/458; 340/461; 340/641; 340/642; 315/129; 315/133; 307/10.8
[58] Field of Search .................. 340/458, 461, 340/465, 475, 479, 483, 641, 642; 307/10.8; 315/129, 130, 131, 132, 133

[56] References Cited

U.S. PATENT DOCUMENTS

| | | | |
|---|---|---|---|
| 3,546,687 | 12/1970 | Rojek et al. | 340/458 |
| 3,875,560 | 1/1975 | Williams | 340/458 |
| 3,965,456 | 6/1976 | Schwellenbach | 340/458 |
| 4,173,750 | 11/1979 | Riba | 340/458 |
| 4,745,339 | 5/1988 | Izama et al. | 340/461 |
| 5,254,971 | 10/1993 | Sutterlin et al. | 340/458 |
| 5,266,840 | 11/1993 | Leipold et al. | 307/125 |

*Primary Examiner*—John K. Peng
*Assistant Examiner*—Edward Lefkowitz

[57] ABSTRACT

A lamp-diagnosing system comprising electronic current-indicating apparatus and a dashboard display scheme, for vehicles: The system provides a dashboard display which shows the actions of external signaling lamps and hence their status (monitoring mode). Another embodiment provides indication only when a lamp fails (alarm mode). The invention offers improved operator awareness of vehicular signaling, serviceability, improved safety, low cost, and ease of incorporation into existing circuitry.

7 Claims, 1 Drawing Sheet

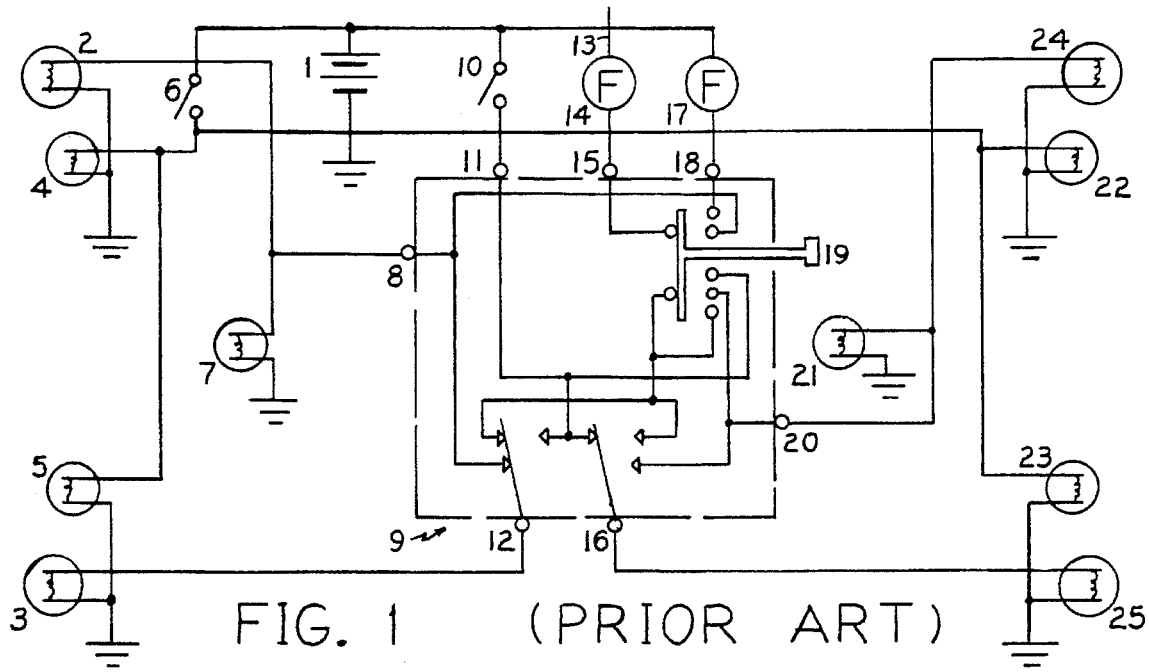
FIG. 1 (PRIOR ART)
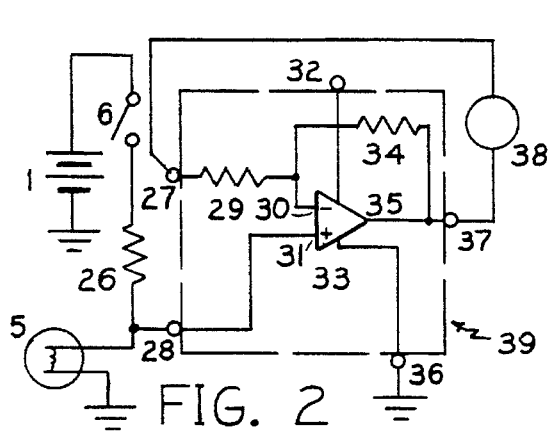
FIG. 2
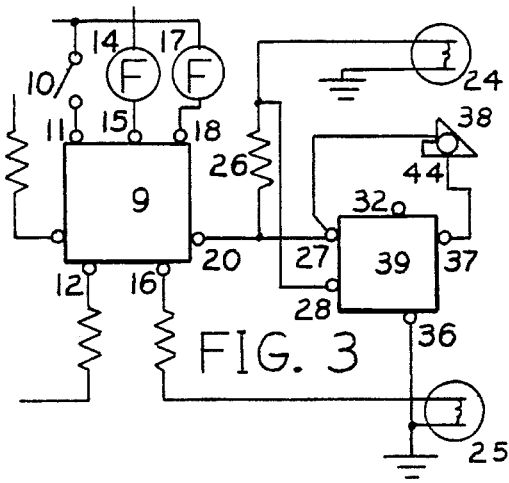
FIG. 3
FIG. 4 (PRIOR ART)
FIG. 5
FIG. 6
FIG. 7
FIG. 8

VEHICULAR LAMP STATUS DISPLAY SYSTEM

REFERENCES CITED

Chilton's Chassis Electronics Service Manual, 1989 ed., Chilton Publishing Co., Chilton Way, Radnor, Pa. pp. 4-1, 2, 3, 4, 6, 9, 10, 11, 12, 15, 16, 18, 19, 20, 23, 25, 26, & 27.

Cirovic, Michael, *Basic Electronics*, Reston Publishing Co., Reston, Va., 1974, p. 449.

Ford Light Truck Shop Manual, 1980, p. 32-41-1

Linear Integrated Circuits Data Book, Vol. I, Texas Instruments Corp., 1989, pp. 2-403 & 406.

Trantner, A., Automobile Electrical Manual, Hayes Publishing Group, Sparkford Yeovil Somerset BA22 7JJ, England, 1983, Chapter 10.

U.S. Pat. No. 5,235,317, "Adaptive Lamp Monitor with Non-linear Normalization Factor", Filed Jun. 5, 1992, Gregory E. Sutterlin, et al (G.M. Corp).

U.S. Pat. No. 5,254,971, "Adaptive Lamp Monitor Using Capacitors and Switches", Charles E. Vink, et al, Filed Jun. 8, 1992 (G.M. Corp.)

U.S. Pat. No. 5,266,840, Ludwig Leipold, et al, "Circuit for Detecting the Failure of a Load Which is Connected in Series with an Electronic Switch", Filed Dec. 31, 1992.

BACKGROUND OF THE INVENTION

In any system of switchable exterior electrical signaling lamps in which an operator of the switches at some dashboard cannot see the lamps from his location: a monitoring device is desirable which indicates dashboard whether each lamp is functioning properly.

If an electrical lamp conducts the proper current when impressed with proper potential difference, hereinafter the status of the lamp is termed "functional".

In the prior art a common way of indicating the lighting of a remote electrical lamp is to connect a pilot light in parallel with the lamp, so that the pilot light lights with and only with the application of a potential difference areas the parallel combination, e.g., the turn-signal dash indicators in a typical automobile. (See Chilton, op.cit., for a survey of automotive dash-indicator displays array). This type of indicator circuit does not indicate whether the lamp is functional, however.

In the vehicular application the most important exterior signaling lights are the turn-signal, brake, and tail lamps, because of safety. Yet the prior art has not yet fielded a device to my knowledge capable of definitely indicating the status of these lamps. The thermal turn signal flasher used from ca. 1950 to 1990 provided a clicking sound which indicated normal current through two incandescent lamps in parallel, and if one was not functional the clicking cadence was altered. (See A. Trantner, loc.cit. for a survey of flashers and circuits).

Since the primary application of the present invention is to the signaling system of an automobile, therefore consider the schematic diagram of FIG. 1 of an automobile signaling system of the prior art comprising a battery 1 for direct current (d.c.) electricity, a steering-column-mounted turn-signal switch assembly 9, having left detent, OFF, and right detent positions, front and rear, left and right external signaling lamps 2, 3, 24, & 25, parking lamp switch 6, left and right parking lamps 4 & 22, left and right tail lamps 5 & 23, a dashboard containing turn-signal indicator lights 7 & 21, turn-signal flasher 14, brake switch 10, hazard warning flasher 17 (with knob symbolized by 19), ignition net 13, and a system ground. (See also Ford Light Truck Shop Manual, loc.cit. for circuitry.) In FIG. 1 the turn-signal switch is shown in the left detent position, so that lamps 2 & 3 are flashing, and the closing of the brake switch 10 will cause right rear lamp 25 to shine steadily. The circles 8, 11, 12, 15, 16, 18, & 20 denote terminals of the turn-signal switch.

SUMMARY OF THE INVENTION

The object of the present invention is to provide a system for displaying on dashboard the actions of each exterior signaling lamp in a vehicular signaling system, so that an operator of the system can read the status of the lamps.

"Light" herein refers to a source of light; "indicator" refers to an indicator light in combination with an aperture or figure.

The present invention comprises a multiple of direct-current-detection circuits, one for each signal lamp circuit in said signaling system and each having a corresponding dash-indicator. There are two aspects of the invention: the dash-indicator array scheme (FIGS. 5 & 6), and the current-indicator (C.I.) apparatus (FIG. 2).

The dash-indicator array scheme comprises a method of arranging a plurality of indicator lights on a dashboard such that the pattern of the indicator-light array models the physical layout of the corresponding signal lamps. The dash-indicator array is in the form of two subarrays, one for the parking and tail lamps, and the other for the four turn-signal lamps. For the four turn-signal indicators the two left ones 42 & 43 are placed, such that, together, they form a pattern suggesting the left-point arrow 40 (FIG. 4) commonly used in the prior art, and similarly for the two right turn-signal indicators 44 & 45.

The current-indicator (C.I.) apparatus comprises a multiple of the electronic current-indicator (C.I.) units illustrated schematically by FIG. 2. There is one C.I. unit for each exterior signal lamp circuit. Each C.I. unit comprises a current sensing resistor 26, an amplifier unit 39, and an indicator light 38. Each amplifier unit comprises in turn a differential-input amplifier 33 having positive input port 31, inverting input port 30, and output port 35 (which is also the output terminal 37 of said amplifier unit), feedback resistor 34, input resistor 29, and power terminal 32. Ground for each C.I. unit is vehicle ground; power terminal 32 is common to all C.I. units of a subarray. Lamp 5 symbolizes the typical vehicle signal lamp; switch 6 typifies the existing vehicular switch for said lamp circuit.

Each current-indicator unit therefore has two input terminals, high input terminal 27 and low input terminal 28, and output terminal 37.

The circuit made up of battery 1, switch 6, and lamp 5, represents the existing vehicular lamp circuit. The current-indicator unit is installed by braking this circuit at some point between circuit switch and said signal lamp, making a high end and a low end. High input terminal 27 is connected to said high end, and low input terminal 28 is connected to said low end.

When current flows through resistor 26, the potential difference across 26 causes the emf at amplifier output port 35 to decrease, which tends to cause current to flow through indicator light 38. Let $V_O$ by the emf at output port 35, $V_{31}$ and $V_{30}$ the respective emfs at the inputs ports 31 and 30. Then the gain A of amplifier 33 is defined;

$$A = \frac{V_0}{V_{31} - V_{30}}$$

For the current indicator to function as desired gain A must by a positive scalar, amply large. Over the range of inputs $V_{31}$ and $V_{30}$ for which this holds, Kirchoff's rules yield $$V_{Batt} - V_0 = \left(1 + \frac{R_{34}}{R_{29}}\right) I_{lamp} R_{26}$$

where $I_{lamp}$ is the current through the lamp, and $R_{34}$ is the resistance of resistor 34, etc. This formula, when valid, ensures that indicator light 38 will light when and only when current flows through said lamp circuit. Barring a short circuit to ground from some point in the wiring between terminal 28 and lamp 5 (which would blow a fuse), the current-indicator unit thus lights 38 when and only when current flows through sensing resistor 5. If considered as a logic variable, the logic value on the output port swings from a logic 0 with respect to ground (or a logic 1 with respect to d.c. terminal) when $I_{lamp}$ is zero, to logic 1 (or logic 0, respectively( when $I_{lamp}$ is sufficiently large.

The amplifier unit 39 differs from a prior art application of an operational amplifier employed as a current amplifier (as in Michael Cirovic,loc.cit.), as follows: (a) It must be able to sense current through anode whose potential may vary from ground potential to the potential of the d.c. source, and (b) in the present invention the amplifier 33 must have special characteristics: It must 1. function with ample gain with its common mode input emf at battery potential (emf);
2. function such that current into output port 35 is nil when emf on positive input port 31 is at ground potential;
3. be stable with common mode emf anywhere between ground and battery potential.

It is also desirable to have said amplifiers in the form of a multiple amplifier on a single integrated circuit substrate.

Such amplifiers have been found in the prior art, operational amplifiers having junction field effect transistor inputs, typified by the standard type number TL084, a quadruple amplifier. (See Texas Instruments. Corp.,loc. cit.)

The present invention exhibits the following novel and useful improvements and points of comparison with regard to specific works of the prior art:

1. "Adaptive Lamp Monitor with Non-linear Normalizing Factor" converts potential differences across resistor carrying lamp-current to a digital signal and has a computer to process this. The potential differences are multiplexed.
2. "Adaptive Lamp Monitor Using Capacitors and Switches" has potential differences as above but transferred to capacitors, then transferred via little switches to circuits which compare lamp current to a reference equivalent. A digital version of this result is produced.
3. "Circuit for Detecting the Failure of a Load . . . " could be used wherein the load is a lamp, but the circuit employs an N-channel f.e.t. in a source follower circuit which wold perhaps not be practical in an automotive system, because of the requirement of gate potential higher than battery potential. In the present invention any switch of the prior art may be used.

No dashboard display scheme is set forth in any of the three above mentioned inventions.

The above-mentioned class of amplifiers have the further desirable characteristic that, when unpowered, (battery disconnected from terminal 32) but with switch 6 closed, they pass a moderate current through light 38 into output port 35, thus providing a "prove-out"](test of indicator independent of lamp status) of switch 6 and light 38.

DESCRIPTION OF THE FIGURES

FIG. 1: Typical Signaling Circuit of the Prior Art (Schematic)

FIG. 2: Current-Indicator Unit Circuit (Sckematic) shown in left rear tail lamp circuit.

FIG. 3: Augmentation of Turn-Signal Circuit with Current-Indicator Unit (Right front current-indicator unit shown)

FIG. 4: Turn-Signal Indicators of the Prior Art

FIG. 5: Turn-Signal Indicator Subarray

FIG. 6: Parking-and-Tail-Lamp Indicator Subarray in Headlamp Switch of the Prior Art FIG. 7: Right Side View of Headlamp Switch Augmented with Four C.I. Units FIG. 8: Combined Turn-Signal Subarray, Parking-and-Tail-Lamp Subarray, and Auxiliary-Brake-Lamp Subarray

DESCRIPTION OF THE PREFERRED EMBODIMENTS

In the preferred embodiment the present invention is intended to augment the automotive signaling system of the prior art comprising the elements enumerated in BACKGROUND . . . above, plus a dash printed circuit board located behind said dashboard, a seven-wire cable running from turn-signal switch terminals to signal lamps, brake switch, and flashers, a headlamp switch 51, (FIGS. 6 & 7) having connector tabs, a headlamp switch socket 54, and a speedometer bezel 46, inside which are said turn-signal indicators 40 & 41.

Each current-indicator (C.I.) unit must have components chosen appropriately for its corresponding signal lamp, as follows: (See FIG. 2). Current-sensing resistor 26 is first chosen such that, when normal lamp current is flowing, the drop in emf across said resistor is more than four times the largest input offset voltage ever anticipated in the amplifier 33. This quantity, times the closed loop gain $$\left(1 + \frac{R_{34}}{R_{29}}\right),$$

must equal the operating potential difference of said lamp. Indicator lights are l.e.d.s (light-emitting diodes).

The turn-signal indicator subarray replaces the two turn-signal arrows of the prior art with arrow segments (42, 43, 44, & 45. An indicator light is behind each of these, 42 corresponding to left front, 43 to left rear, 44 to right front, etc., to form the turn-signal subarray. The dash printed circuit board is augmented wit the four amplifier units, an eight-pin p.c.-mounted connector, and conductors connecting it to the four pairs of input terminals of said amplifier units. The current-sensing resistors are integral to said turn-signal cable wires, thus generating eight nodes. An eight-wire cable runs from said nodes to said eight-pin p.c.-mounted connector. Power for the amplifier units is taken from said ignition net 13, so that said C.I. units consumer power only when ignition is on.

The dash indicator subarray for the two parking and the two tail lamps (FIGS. 6 & 7) has the four indicator l.e.d.s 47–50 in a rectangular array about the periphery of said headlamp switch 51. This has the advantage of demarcating the switch at nighttide. The four corresponding amplifier units are integrated into said headlamp switch 51, as follows: A housing 52 is made with connector tabs identical to those of said headlamp switch on one end and a socket to mate with said headlamp switch tabs on the other. This housing contains a resistor for each of the four lamps and a p.c. card carrying the four amplifier units. Four miniature two-wire cables 53 connect said l.e.d.s to said four amplifier units. Since the switch is common to the four amplifier units, the high input terminals are common, and the power terminals 32 may be connected to this terminal, so that said C.I. units consume power only when said parking and said tail lamps are on.

In said preferred embodiment, and in the following three embodiments, the mode of the present invention shall be terminated "monitoring".

Another embodiment has the apparatus described above, but the two dash-indicator subarrays are superimposed to form a pattern having all eight indicators (42–45 & 47–50) in a single array similar to the layout of the exterior signaling lamps. (See FIG. 8).

Another embodiment has the apparatus and dash-indicator scheme of the preceding paragraph, but with the addition of three C.I. units for a vehicle having a separate pair of brake lamps and an elevated third brake lamp. (See FIG. 8). Indicators 55 & 57 correspond to said separate brake lamps, 56 to said elevated third brake lamp.

Another embodiment has a single subarray of four dashboard indicators for the four turn-signal lamps only, as in FIG. 5. This embodiment affords the most benefit in terms of cost.

A benefit of the split arrow indicator is that the color of the top half could be the amber of the frost turn-signal lamps whereas the color of the bottom halves could be the red of the brake lamps, improving operator awareness of the lamps being monitored. The split arrow also provides contrast if one lamp is nonfunctional.

In some instances it may be preferable to have the logically inverse indicator function, that is, with light 38 functioning when current is not flowing through signaling lamp 5 although switch 6 is closed. In this case power terminal 32 is connected to high input terminal 27, and indicator light 38 is connected from output terminal 37 to ground. This embodiment has the advantage that there is one, rather than two, wire to indicator light 38. In this embodiment the mode shall be terminated "alarm".

A trivial variation on the circuit of said C.I. unit (FIG. 2) has said indicator light connected from said output terminal 37 to said low input terminal 28, rather than said high input terminal 27. This works the same as the circuit of the preferred embodiment because of the small potential difference between those two terminals 27 & 28.

I claim:

1. A lamp status display system for a vehicle having an electrical signaling system including a plurality of exterior lamps in a physical layout, each connected through a switch to a direct current source, said lamp status display system, which indicates the status of each exterior lamp, comprising:

a plurality of current indicator units, each current indicator unit, which is connected to one of said exterior lamps, comprising:

a high input terminal a low input terminal, and an output terminal;

a sending resistor connected in series from said switch to said exterior lamp, with said high input terminal connected to a high end of said sensing resistor and said low input terminal connected to a low end of said sensing resistor;

a feedback resistor and an input resistor;

a differential-input amplifier having a positive input port, an inverting input port, an output port, and a power terminal, wherein said feedback resistor is connected from said inverting input port to said output port, said input resistor is connected from said high input terminal to said inverting input port, said positive input port is connected to said output terminal, said power terminal is connected to said high input terminal, and an indicating means is connected from said output terminal to said power terminal;

wherein said lamp status display system operates so that said indicating means for each of said exterior lamps lights if and only if current flows through each of said exterior lamps when said switch is closed, where by said indicating means lights if and only if each of said exterior lamps is functional.

2. The lamp status display system of claim 1 wherein said indicating means are located on a dashboard of the vehicle in a array scheme having a pattern which models orientatively the physical layout of the exterior lamps, whereby an operator of the vehicle may discern a nonfunctional status of each of said exterior lamps by viewing the physical layout on the dashboard.

3. The lamp status display system of claim 1 wherein the exterior lamps include the left front, left rear, right front, and right rear turn signal lamps.

4. The lamp status display system of claim 3 wherein said indicating means are located on a dashboard of the vehicle in an array scheme having a pattern which models orientatively the physical layout of the left front, left rear, right front, and right rear turn signal lamps, whereby the indicating means for the left front and left rear turn signal lamps resemble an upper half and lower half of a left pointing arrow, respectively, and the indicating means for the right front and right rear turn signal lamps resemble an upper half and lower half of a right pointing arrow, respectively.

5. The lamp status display system of the claim 1 wherein the differential-input amplifier has a pair of junction field-effect transistors, each having a gate,so that one gate is connected to the positive input port and the other is connected to the inverting input port, and each having an associated common-mode-input potential range which includes the potential on the power terminal.

6. The lamp status display system of claim 1 wherein the exterior lamps include the brake lamps.

7. The lamp status display system of claim 6 wherein said indicating means are located on a dashboard of the vehicle in an array scheme having a pattern which models orientatively the physical layout of the brake lamps.

* * * * *